Feb. 25, 1941.  W. F. GROENE  2,233,309
CENTER DRIVE LATHE LOADING DEVICE
Filed Dec. 6, 1938  5 Sheets-Sheet 4
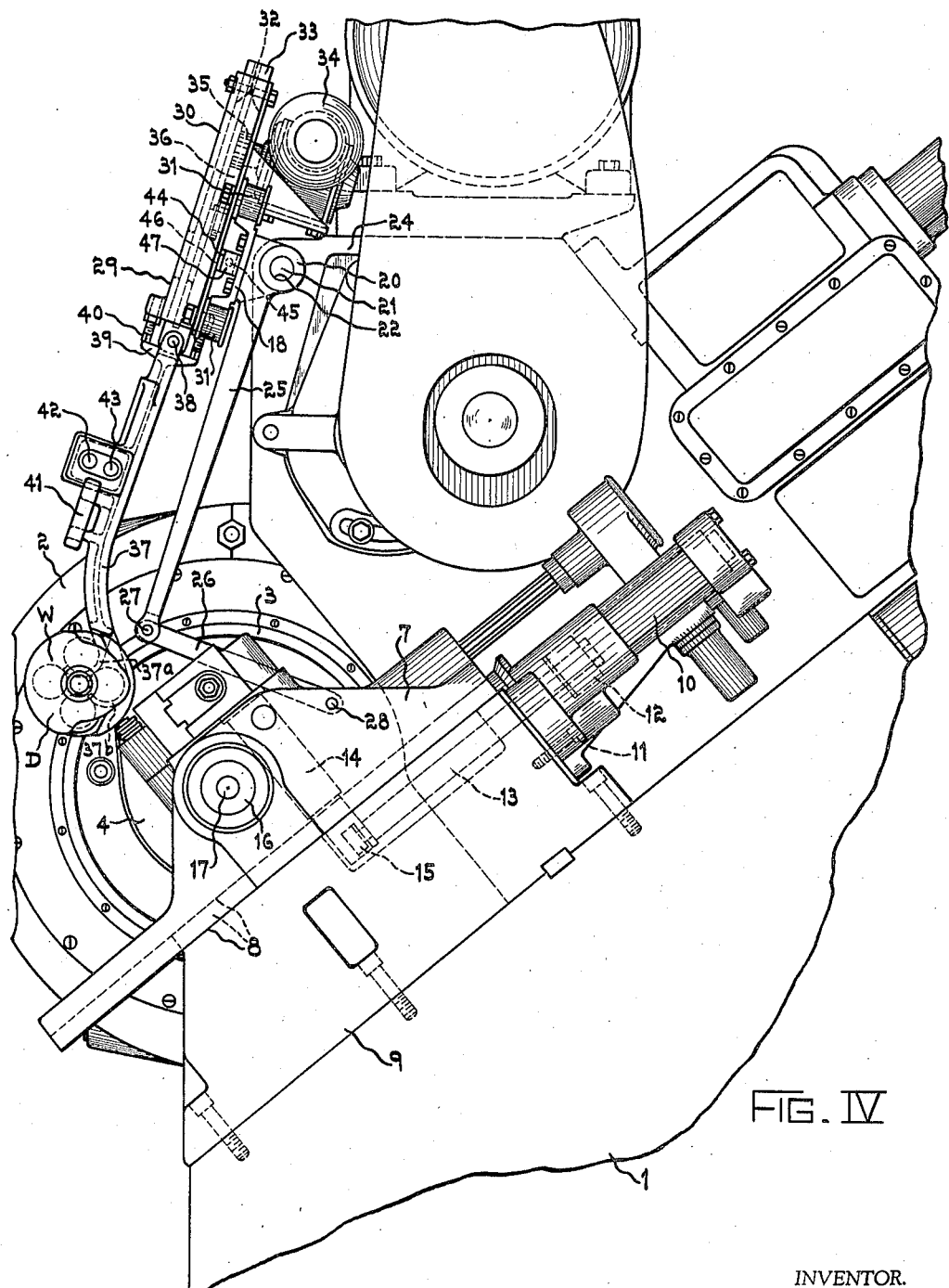
FIG. IV
INVENTOR.
WILLIAM F. GROENE Feb. 25, 1941.   W. F. GROENE   2,233,309
CENTER DRIVE LATHE LOADING DEVICE
Filed Dec. 6, 1938   5 Sheets-Sheet 5
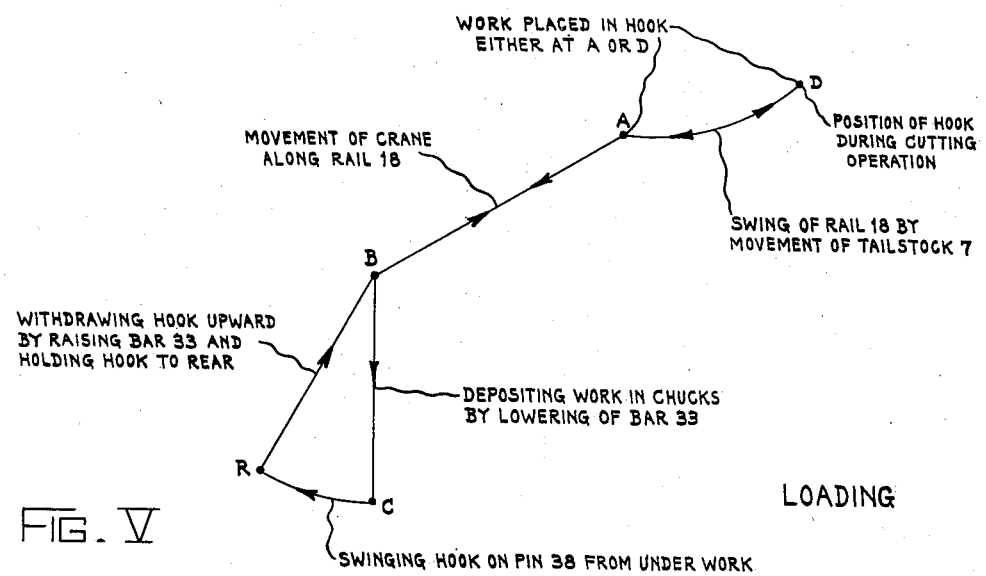
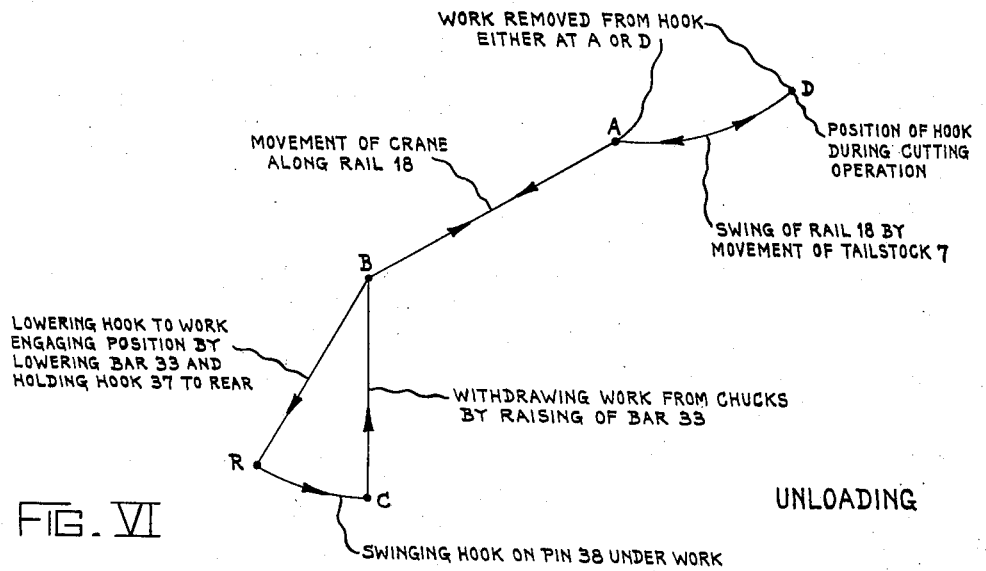

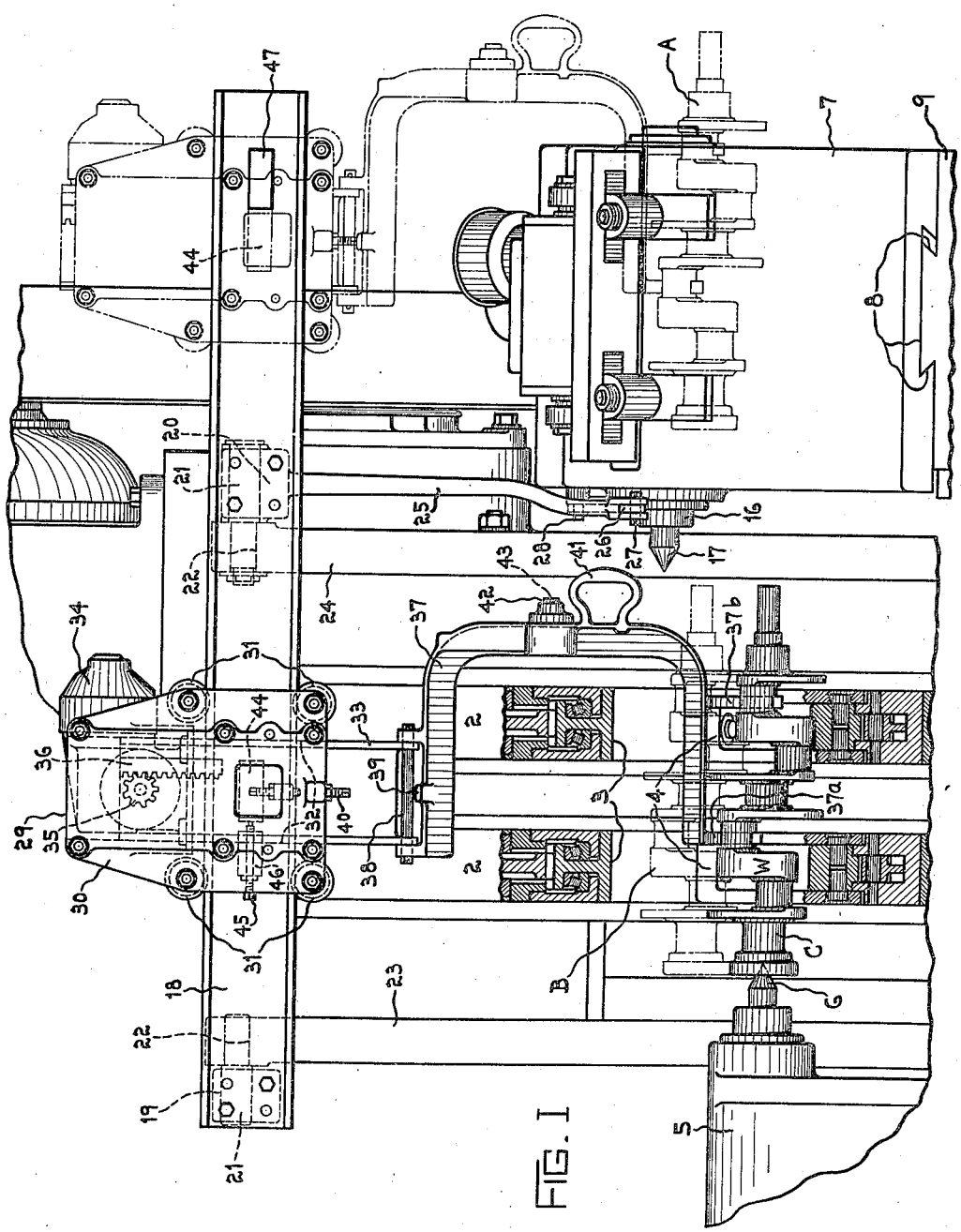

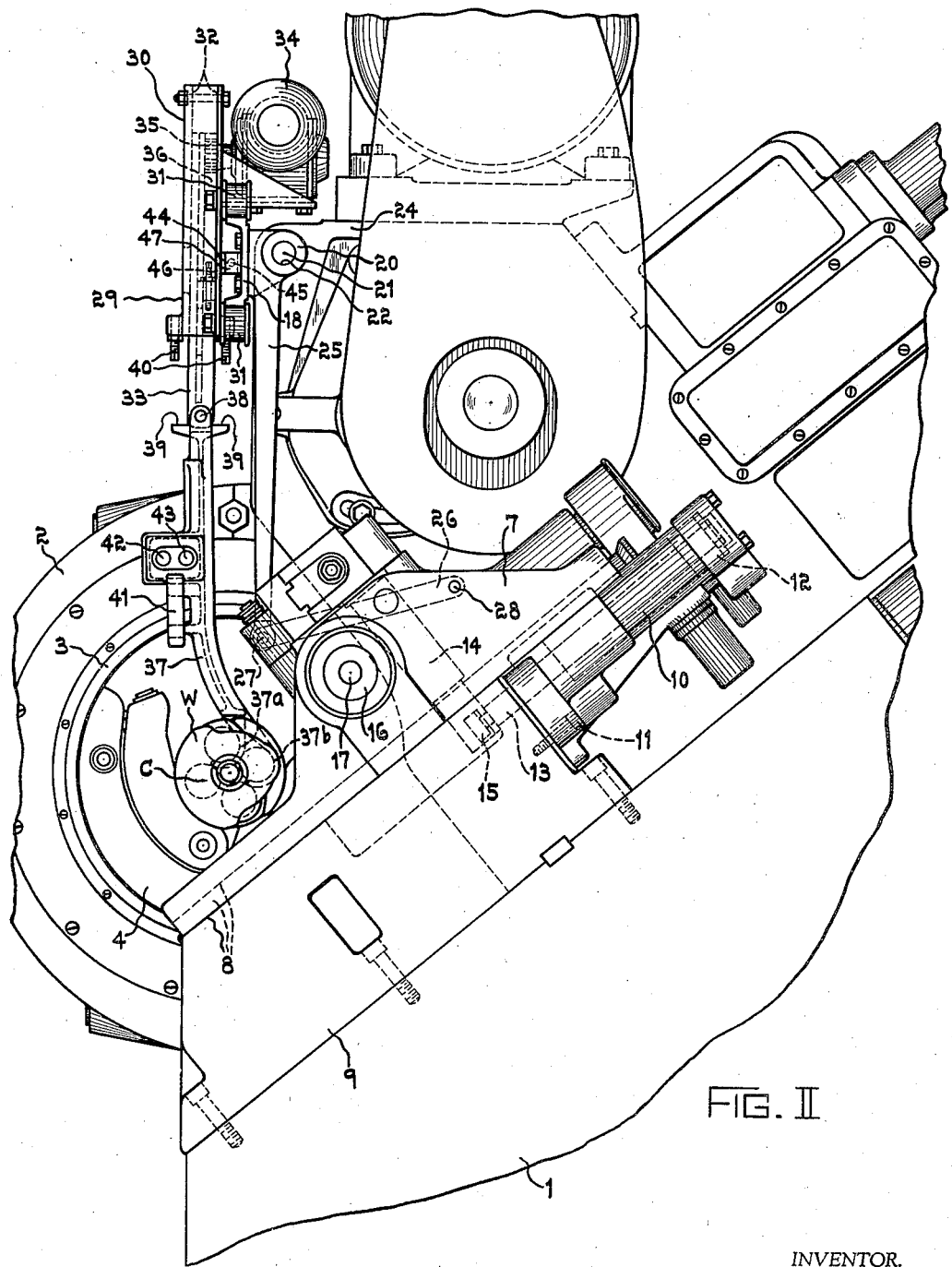
FIG. II

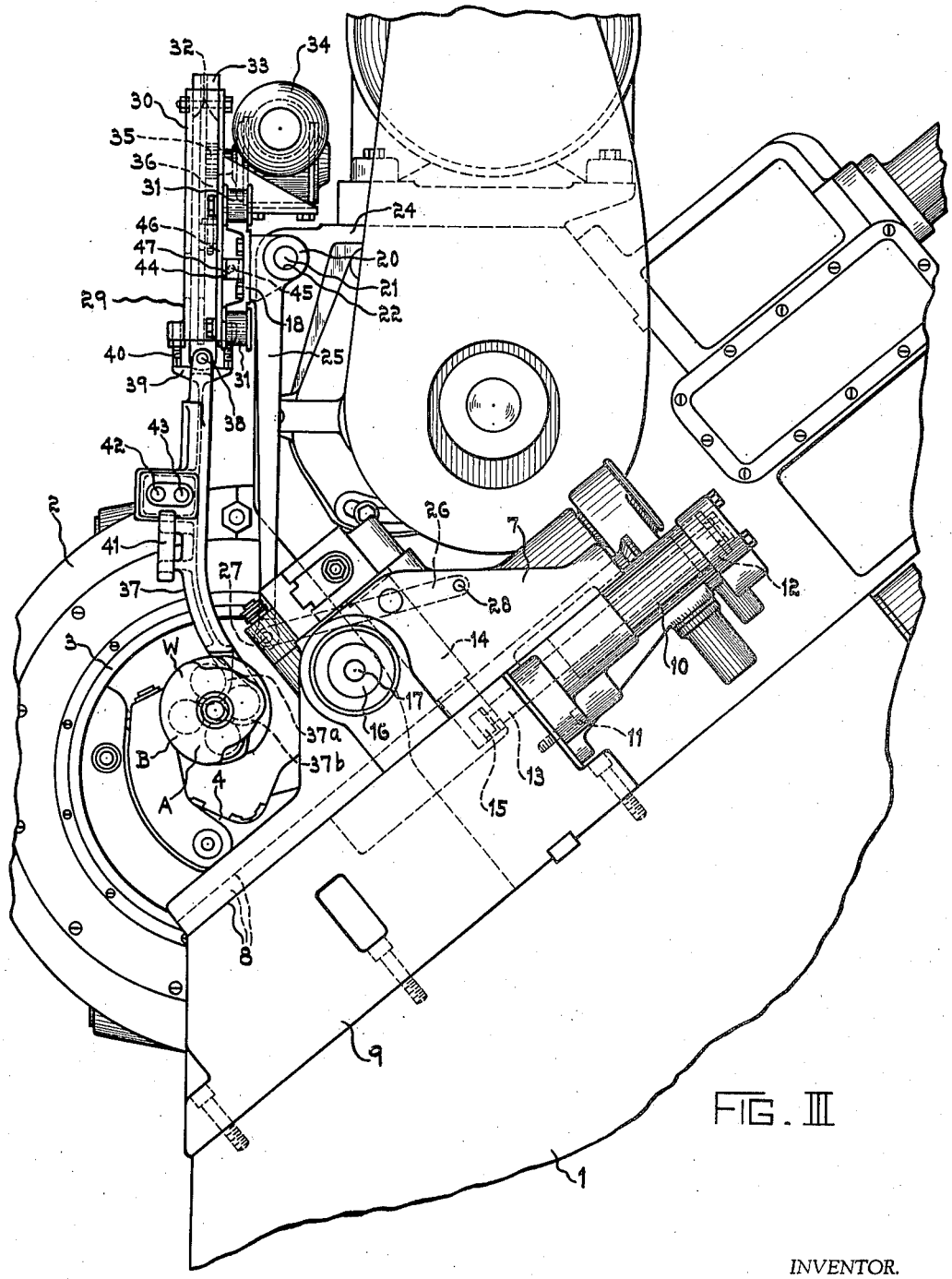

Patented Feb. 25, 1941

2,233,309

UNITED STATES PATENT OFFICE 2,233,309

CENTER DRIVE LATHE LOADING DEVICE

William F. Groene, Cincinnati, Ohio, assignor to The R. K. LeBlond Machine Tool Company, Cincinnati, Ohio, a corporation of Delaware Application December 6, 1938, Serial No. 244,224

29 Claims. (Cl. 82—2)

This invention pertains to certain improvements and additions to loading and unloading devices for center drive crankshaft lathes of a character shown in Patents 1,700,721 dated January 21, 1929, 1,843,359 dated February 2, 1932, and 2,069,107 dated January 26, 1937. More particularly, this invention pertains to certain improvements in loading devices of the above character which are applied to center drive lathes in which the tailstock or tailstocks are moved relative to the center drive chucking mechanism in loading or unloading work in such lathes, for example, lathes of a type shown in copending applications Serial No. 209,738 filed May 24, 1938 and Serial No. 271,304 filed May 2, 1939.

An object of this invention is to provide an arrangement whereby work may be loaded or unloaded while supported rigidly by use of a loading crane while located substantially on the axis of rotation of the center drive chucking devices in order to effect economy in constructing these devices as small as possible.

Another object of this invention is to provide means for automatically positioning the loading crane in accordance with the movements of the tailstock of the center drive lathe.

Still another object is to interconnect the rail of the loading crane with the movement of the tailstock so as to prevent interference between the hook of the crane and the tailstock when the tailstock is moved into aligned work engaging position with the center drive chucking devices.

Further objects and advantages of this invention will appear from a detailed description of the drawings, in which:

Figure I is a front view, partly in fragmentary section, of a portion of a double center drive lathe having a movable right hand tailstock for loading and unloading work in the lathe.

Figure II is a right hand end elevation of the lathe of Figure I showing the loading crane in position for raising or lowering the work in the center drive chucking devices.

Figure III is a right hand end elevation of the lathe showing the loading crane with its hook raised and in position for axially sliding work into or out of the center drive chucking devices with the lathe tailstock withdrawn from aligned work engaging position.

Figure IV is a right hand end elevation of the lathe showing the position of the loading crane when the movable tailstock is in aligned work engaging position.

Figure V is a diagram of the movements of the loading device when inserting a work piece in the lathe.

Figure VI is a diagram of the movements of the loading device when removing a work piece from the lathe.

For illustrative purposes I show my invention applied to a double center drive crankshaft lathe having a base 1 upon which are mounted the center drive housings 2 carrying the rotatable ring gears 3 containing chucking devices 4, for example, of a character shown in copending application Serial No. 212,325 filed June 7, 1938.

In this particular illustration the left hand tailstock 5 is fixed on the base 1 and has the usual axially movable lathe center 6 adapted to engage the end of a work piece or crankshaft W. The movable right hand tailstock 7 is slidably mounted on dovetail guideways 8 on the support 9 fixed on the base 1 whereby it may be reciprocated to or from aligned work engaging position radially of the axis of rotation of the center drive chucking devices 3. This motion may be effected by the fluid pressure cylinder 10 fixed on the support 9 by screws 11 through its piston 12, rod 13, and the stud 14, to which the rod 13 is suitably connected at 15, fixed in the tailstock 7. The barrel 16 and center 17 of this tailstock 7 may be actuated axially and clamped to the tailstock by fluid pressure for engaging or disengaging the work W at the proper time, for example, in a manner illustrated in the above copending application Serial No. 212,326.

It is to be understood that either or both of the tailstocks 5 and 7 may be made movable. In instances where both of the tailstocks are movable two cranes or loading devices are utilized, as in Patent 2,069,107, with the features of this invention. The loading crane (or cranes) is mounted for horizontal movement on a rail 18 to which is fixed brackets 19 and 20 having studs 21 fixed therein and journaled in bearings 22 in suitable upright supports 23 and 24 of the machine frame. The bracket 20 has an integral downwardly extending arm 25 which is connected by means of the link 26 and associated pins 27 and 28 to the tailstock 7 so that as the tailstock is reciprocated on the guideways 8 the rail 18 may be rocked about a horizontal axis defined by the studs 21.

The crane 29 itself is arranged substantially like that of the crane shown in my Patent 1,700,721 and comprises a plate 30 which is carried on the rollers 31 for horizontal movement along the rail 18. Carried on the plate 30, in appropriate guideways 32, is the vertically reciprocatable lifting bar 33 which is actuated by a suitable torque motor 34 mounted on the plate and connected through appropriate speed reduction gearing to the pinion 35 which operates in the rack 36 fixed to the bar 33.

On the lower end of the bar 33 is mounted the hook 37 by means of the pin 38 so that it may swing in substantially the same direction as the swinging of the rail 18. On the lower portion of the hook 37 is formed the work engaging portions 37a and 37b and on the upper portion are formed the abutment lugs 39 which engage against the abutment screws 40 carried on the plate 30 when the bar 33 is raised so as to rigidly support the hook against swinging movement when inserting or removing work W axially of the chucking devices and when loading work on the crane hook. A manipulating spade handle 41 formed on the hook 37 has associated with it a "raise" push button 42 and a "lower" push button 43 for controlling the operation of the motor 34 to thereby provide single handle control for manipulating the loading device in any of its functions.

The operation of this device is substantially as follows: Assuming the work W, in Figure I, has just been completed and the chucking devices 4 have been released from the work, the center 6 withdrawn, and the center 17 and the tailstock 7 withdrawn to the position shown in Figures II and III, the empty loading crane 29, with its hook in raised position A, as in Figures I and III is rolled along the rail 18 from position A to position B against an accurately set positive stop effected by the abutment block 44 fixed on the plate 29 striking the set screw 45 fixed in adjusted position in the abutment 46 fixed on the rail 18. A similar abutment block 47 fixed on the rail 18 determines the position A when the crane is moved out of the chucking devices.

Continuing, with the crane at position B, the operator with his hand about the handle 41 actuates the "lower" push button 43 with his thumb and holds the hook to the rear of the work piece W as the bar 33 lowers the hook to position R, the work engaging portions 37a and 37b being brought down in back and a little below the work piece. The operator then swings the hook 37 forward to bring the portions 37a and 37b under the work piece W whereupon the "raised" push button 42 is operated by the thumb to pick up the work from the position C as shown in Figures I and II and raising it until the abutment lugs 39 engage the screws 40 to rigidly hold the crane hook in the position B shown in Figures I and III. The crane is then rolled to position A where the finished work is removed from the loading device and a rough work piece placed thereon which is then loaded in the chucking devices by following a procedure the reverse of that above outlined.

In order to prevent interference between the tailstock 7 when in aligned work engaging position during the cutting operation, the rail 18 is adapted to be rocked by the tailstock, as described, to a position D, Figure IV, while the hook is held in rigid position against the abutment screws 40. When in this position rough work may be loaded on and finished work removed from the crane hook, a feature particularly time saving when two cranes are utilized as discussed above in Patent 2,069,107 as under these conditions one crane is being unloaded and the other crane is being loaded during the cutting operation of the lathe.

In order to more clearly indicate the path of travel of the work engaging portions 37a and 37b during the loading of the work in the lathe and the removal of the work therefrom, diagrams Figures V and VI are referred to. In Figure V is illustrated the movements of the crane hook portions 37a and 37b when loading the work in the chucks. The rough work piece may be placed on the hook portions either at D or A when two cranes are used as above mentioned. When the tailstock 7 moves away from work engaging position the loading rail 18 swings the hook portions from D to A. The crane is then rolled along the rail to pass the work piece axially into the center drive chucking devices at B. The hook is then lowered moving the work piece from B to C to deposit it in the chucking devices. The hook then is swung manually from C to R removing it from under the work. The hook, while thus held to the rear of the work is then raised from R to B. The crane is rolled from B to A and the rail 18 tilted from A to D as the tailstock 7 comes into work engaging position for the cutting cycle.

At the completion of the cutting cycle the crane is actuated as in Figure VI. As the tailstock withdraws the empty loading crane tilts from D to A whereupon it is rolled along the rail 18 from A to B. The hook is then swung back manually as it is lowered from B to R. The hook is then released and allowed to swing its work engaging portions 37a and 37b under the work from R to C. The crane is then operated to raise the work from C to B. The crane is then rolled along the rail 18 from B to A, where the work is removed. Work may be removed at either A or D when two cranes are used as above mentioned.

When two cranes are used one is used for loading as in Figure V operating from one side of the chucking devices and the other used for unloading as in Figure VI, in which case both tailstocks are movably arranged. This, as stated before allows both cranes to be loaded and unloaded during the cutting operation of the machine thus effecting further saving of time as particularly set forth in Patent 2,069,107.

It will thus be seen that since the loading device is arranged in connection with the moving tailstock 7 of the lathe, that the amount of travel required to move the work vertically from position C to B and vice versa need be only the very minimum necessary to clear the work piece from the chucking devices 4 to allow it to be axially moved out of them. It is not necessary to raise the work clear up over the center 17 of the tailstock 7 as is necessary in the former patents cited above. Thus time is saved in raising and lowering the work.

This also permits of making the tailstock barrel any size and sufficiently heavy to withstand the cutting forces which is a difficult problem to overcome in the prior arrangements without making the center drive ring gears excessively large. This arrangement, therefore, effects great economy in making the ring gears much smaller than in the former structures so as to make practical and economical the use of anti-friction bearings for these gears.

Having thus fully set forth and described my invention, what I claim and desire to secure by United States Letters Patent is:

1. In a lathe having a chucking device and a work supporting member movable to and from aligned work engaging position with said device, a loading device for charging work into or removing it from said chucking device, means for moving said loading device to or from aligned charging or removing position relative to said chucking device, and means for moving said work supporting member out of aligned position when said loading device is moved to said charging or removing position.

2. In a lathe having a chucking device and a work supporting member movable to and from aligned work engaging position with said device, a loading device for charging work into or removing it from said chucking device, means for moving said loading device to or from aligned charging or removing position relative to said chucking device, and means for simultaneously moving said work supporting member out of aligned position and moving said loading device into aligned charging or removing position.

3. In a lathe having a chucking device and a tailstock movable to and from aligned work engaging position with said device, a loading device for charging work into said chucking device, and means operated by the movement of said tailstock for bodily moving said loading device to or from charging position relative to said chucking device.

4. In a lathe having a chucking device and a tailstock movable to and from aligned work engaging position with said device, a loading device for charging work into said chucking device, means for moving said loading device axially of said chucking device for charging work into said device, and means operable by the movement of the tailstock to move said loading device to or from charging position relative to said chucking device.

5. In a lathe having a chucking device and a tailstock movable to and from aligned work engaging position with said device, a loading device for charging work into said chucking device, means for moving said loading device axially of said chucking device for charging work into said device, means for moving a work engaging portion of said loading device radially of the axis of rotation of said device when in charging position, and means operable by the movement of the tailstock to move said loading device to or from charging position relative to said chucking device.

6. In a lathe, a base, tailstocks with centers on said base, fixed housings on said base located intermediate the centers, a rotary chucking device in said housings, means for rotating said device, a loading device associated with said base comprising a work holding member movable so as to charge work endwise through the chucking device, said member having movement axially of the chuck, means for maintaining said member rigid as the member inserts the work in the chucking device, means for moving one of said tailstocks to and from aligned work engaging position relative to said chucking device, and means for moving said loading device to and from charging position relative to said chucking device when said work holding member is withdrawn from said chucking device.

7. In a lathe, a base, tailstocks on said base, fixed housings on said base located intermediate the centers, a rotary chucking device in said housings, means for rotating said device, a loading device associated with said base comprising a work holding member movable so as to charge work endwise through the chucking device, said member having movement axially of the chuck, means for maintaining said member rigid as the member inserts the work in the chucking device, means for moving one of said tailstocks to and from aligned work engaging position relative to said chucking device, and means operable by the movement of said tailstock for moving said loading device to and from charging position relative to said chucking device.

8. In a lathe, a base, tailstocks on said base, fixed housings on said base located intermediate the centers, a rotary chucking device in said housings, means for rotating said device, a loading device associated with said base comprising a work holding member movable so as to charge work endwise through the chucking device, said member having movement axially of the chuck, means for maintaining said member rigid as the member inserts the work in the chucking device, means for moving one of said tailstocks to and from aligned work engaging position relative to said chucking device, and means for moving said loading device from charging position relative to said chucking device when said tailstock is moved to aligned work engaging position.

9. In a lathe, a base, tailstocks on said base, fixed housings on said base located intermediate the centers, a rotary chucking device in said housings, means for rotating said device, a pair of loading devices associated with said base each comprising a work holding member movable so as to charge and unload work endwise through the chucking device, said member having movement axially of the chuck, means for maintaining said member rigid as the member inserts the work in the chucking device, means for moving said tailstocks to and from aligned work engaging position relative to said chucking device, and means for moving said loading devices to and from charging and unloading position relative to said chucking device when their work holding members are withdrawn from said chucking device, whereby one device is adapted to charge a work piece into and the other device is adapted to unload a work piece from said chucking device.

10. In a lathe, a base, center drive chucking mechanism mounted on said base, tailstocks mounted on said base each side of said chucking mechanism, axially movable centers in said tailstocks, means for moving one of said tailstocks on said base to or from aligned work engaging position relative to said chucking mechanism, a loading device associated with said chucking mechanism and tailstocks comprising a rail pivotally mounted on said base for rocking movement perpendicular to the axis of work rotation of the lathe, a loading crane mounted on said rail for movement parallel with said axis, a work engaging hook on said loading crane adapted to be raised and lowered, means for rigidly supporting said hook on said crane when in raised position, means permitting swinging movement of said hook perpendicular to said axis when in lowered position, and means for simultaneously rocking said rail and moving said tailstock to and from aligned work engaging position.

11. In a loading device for a chucking device of a machine tool, a loading crane, a work engaging member reciprocatable on said crane, power means on said crane for reciprocating said member, means for rigidly holding said member to said crane when in one reciprocated position, means permitting movement of said member relative to the axis of rotation of said chucking device when in the other reciprocated position, means permitting movement of said crane axially of said chucking device, and single hand control means, for manipulating said crane in all of its movements, mounted on said work engaging member.

12. In a loading device for a chucking device of a machine tool, a loading crane, a work engaging member reciprocatable on said crane, power means on said crane for reciprocating said member, means for rigidly holding said member to said crane when in one reciprocated position, means permitting movement of said member relative to the axis of rotation of said chucking device when in the other reciprocated position, means permitting movement of said crane axially of said chucking device, and single hand control means, for manipulating said crane comprising a handle fixed on said work engaging member for moving said work engaging member and said crane, and control means associated with said handle for effecting reciprocation of said work engaging member, both said handle and control means being manipulatable simultaneously with one hand.

13. In a loading device for a chucking device of a machine tool, a loading crane, a work engaging member reciprocatable on said crane, power means on said crane for reciprocating said member, means for rigidly holding said member to said crane when in one reciprocated position, means permitting movement of said member relative to the axis of rotation of said chucking device when in the other reciprocated position, means permitting movement of said crane axially of said chucking device, means for accurately limiting said axial movement of said crane, single hand control means, for manipulating said crane comprising a handle fixed on said work engaging member for moving said work engaging member and said crane, and control means associated with said handle for effecting reciprocation of said work engaging member, both said handle and control means being manipulatable simultaneously with one hand.

14. In a lathe having a chucking device and a work supporting member movable to and from work engaging position with said device, means for moving said loading device axially of said chucking device when said member is moved from work engaging position, means for bodily moving said loading device radially of the axis of rotation of said chucking device to permit movement of said member to work engaging position, means for raising or lowering a work engaging portion of said loading device, and means for moving said portion radially of said axis.

15. In a lathe having a chucking device and a work supporting member movable to and from work engaging position with said device, means for moving said loading device to work charging position when said member is moved from work engaging position, means for bodily moving said loading device radially of the axis of rotation of said chucking device to permit movement of said member to work engaging position, means for raising or lowering a work engaging portion of said loading device when in said charging position, and means for moving said portion radially of said axis when in lowered position.

16. In a lathe having a chucking device and a work supporting member movable to and from work engaging position with said device, means for moving said loading device to work charging position when said member is moved from work engaging position, means for bodily moving said loading device radially of the axis of rotation of said chucking device to permit movement of said member to work engaging position, means for raising or lowering a work engaging portion of said loading device when in said charging position, means for moving said portion radially of said axis when said loading device is in said charging position, and means for holding said portion rigid with said loading device when said member is in work engaging position.

17. In a lathe having a chucking device and a work supporting member movable to and from work engaging position with said device, means for moving said loading device axially of said chucking device when said work supporting member is moved from work engaging position, means for bodily moving said loading device radially of the axis of rotation of said chucking device to permit movement of said member to work engaging position, means for raising or lowering a work engaging portion of said loading device, and means for moving said portion radially of said axis independent of said loading device.

18. In a lathe having a chucking device and a work supporting member movable to and from work engaging position with said device, means for moving said loading device axially of said chucking device when said work supporting member is moved from work engaging position, means for bodily moving said loading device radially of the axis of rotation of said chucking device to permit movement of said member to work engaging position, means for raising or lowering a work engaging portion of said loading device, means for moving said portion radially of said axis independently of said loading device when said portion is in lowered position, and means for holding said portion rigidly with said loading device when in raised position.

19. In a lathe having a chucking device and a work supporting member movable to and from work engaging position with said device, means for moving said loading device axially of said chucking device when said work supporting member is moved from work engaging position, means for bodily moving said loading device radially of the axis of rotation of said chucking device to permit movement of said member to work engaging position, and means for moving a work engaging portion of said loading device, independently of the loading device as a whole, radially of said axis.

20. In a lathe having a chucking device and a work supporting member movable to and from work engaging position with said device, means for moving said loading device axially of said chucking device when said work supporting member is moved from work engaging position, means for bodily moving said loading device radially of the axis of rotation of said chucking device to permit movement of said member to work engaging position, means for reciprocating a work engaging portion of said loading device, independently of the loading device as a whole, radially of said axis, means for rigidly holding said portion to said loading device when in one reciprocated position, and means allowing radial movement of said portion independent of the loading device when in the other of said reciprocated positions.

21. In a lathe having a chucking device and a work supporting member movable to and from work engaging position with said device, means for moving said loading device axially of said chucking device when said work supporting member is moved from work engaging position, means for bodily moving said loading device radially of the axis of rotation of said chucking device to permit movement of said member to work engaging position, and means for moving a work engaging portion of said loading device, independently of the loading device as a whole, radially of said axis in two different directions.

22. In a lathe having a chucking device and a work supporting member movable to and from work engaging position with said device, means for moving said loading device axially of said chucking device when said work supporting member is moved from work engaging position, means for bodily moving said loading device radially of the axis of rotation of said chucking device to permit movement of said member to work engaging position, and means for moving a work engaging portion of said loading device, independently of the loading device, in two substantially perpendicular directions radially of said axis.

23. In a lathe having a chucking device and a work supporting member movable to and from work engaging position with said device, means for moving said loading device axially of said chucking device when said work supporting member is moved from work engaging position, means for bodily moving said loading device radially of the axis of rotation of said chucking device to permit movement of said member to work engaging position, means for reciprocating a work engaging portion of said loading device, independently of said loading device as a whole, radially of said axis, means for rigidly holding said portion to said loading device when in one reciprocated position, means allowing radial movement of said portion independent of the loading device when in the other of said reciprocated positions, and means for effecting said bodily radial movement of said loading device as a whole when said portion is rigidly held to said loading device.

24. In a lathe having a chucking device and a work supporting member movable to and from work engaging position with said device, means for moving said loading device in a straight line axially of said chucking device when said work supporting member is moved from work engaging position, means for bodily moving said loading device in an arcuate path substantially radially of the axis of rotation of said chucking device to permit movement of said member to work engaging position, and means for moving a work engaging portion of said loading device in an arcuate and a straight line path of travel radially of said axis.

25. In a lathe having a chucking device and a work supporting member movable to and from work engaging position with said device, means for moving said loading device horizontally axially of said chucking device when said work supporting member is moved from work engaging position, means for bodily swinging said loading device perpendicular to the axis of rotation of said chucking device to permit movement of said member to work engaging position, means for moving a work engaging portion of said loading device perpendicular to said axis, and means for swinging said portion perpendicular to said axis.

26. In a lathe having a chucking device and a work supporting member movable to and from work engaging position with said device, means for moving said loading device horizontally axially of said chucking device when said work supporting member is moved from work engaging position, means for bodily swinging said loading device perpendicular to the axis of rotation of said chucking device to permit movement of said member to work engaging position, means for raising and lowering a work engaging portion of said loading device, and means for swinging said portion perpendicular to said axis independently of said loading device.

27. In a lathe having a chucking device and a work supporting member movable to and from work engaging position with said device, means for moving said loading device horizontally axially of said chucking device when said work supporting member is moved from work engaging position, means for bodily swinging said loading device perpendicular to the axis of rotation of said chucking device to permit movement of said member to work engaging position, means for raising and lowering a work engaging portion of said loading device, means for rigidly holding said portion to the loading device when in raised position, and means for swinging said portion horizontally perpendicular to said axis independently of said loading device when in lowered position.

28. In a lathe having a chucking device and a work supporting member movable to and from work engaging position with said device, a loading device for inserting work to a definite axial position in said chucking device compising means for moving said loading device axially of said chucking device when said work supporting member is moved from work engaging position, means to accurately limit said axial movement, means for bodily moving said loading device radially of said axis to permit movement of said member to work engaging position, and means for moving a work engaging portion of said loading device independently of the loading device, radially of said axis.

29. A loading device for a machine tool comprising a horizontally disposed rail pivotally mounted on the frame of said machine tool, means for rocking said rail on said frame, a plate mounted to roll on said rail, a lifting bar slidably mounted for vertical reciprocatory movement on said plate, an electric motor mounted on said plate for raising and lowering said bar, a work supporting hook pivotally mounted on said bar to permit horizontal swinging movement of a work piece on said hook, manipulating means on said hook for manually controlling its swinging, electric control means on said hook associated with said manipulating means for effecting operation of said electric motor, means for holding said work supporting hook rigidly against swinging movement on said plate when said bar is in raised position, and means on said rail for limiting rolling movement of said plate on said rail.

WILLIAM F. GROENE.